United States Patent [19]

Ammeraal

[11] 4,203,512
[45] May 20, 1980

[54] HELICAL CONVEYOR

[75] Inventor: Thomas C. M. Ammeraal, Wormer, Netherlands

[73] Assignee: Ammeraal Nederland B. V., Wormerveer, Netherlands

[21] Appl. No.: 932,664

[22] Filed: Aug. 10, 1978

[30] Foreign Application Priority Data

Aug. 12, 1977 [NL] Netherlands ......................... 7708894

[51] Int. Cl.² ........................ B65G 37/00; B65G 21/18
[52] U.S. Cl. .................................. 198/594; 198/586; 198/778
[58] Field of Search ................ 414/139, 144, 145; 198/560, 586, 591, 594, 595, 778

[56] References Cited

U.S. PATENT DOCUMENTS

| | | |
|---|---|---|
| 2,267,970 | 12/1941 | Boal ........................................ 198/778 |
| 3,595,375 | 7/1971 | Kaufman et al. ................ 198/778 X |

Primary Examiner—Jeffrey V. Nase
Attorney, Agent, or Firm—Kane, Dalsimer, Kane, Sullivan and Kurucz

[57] ABSTRACT

A helical conveyor for transporting cargo or the like along a helical stretch, having a substantially vertical central axis and equipped with an endless conveyor belt, the upper run of this conveyor belt following a helical path and ending at the lower end and at the upper end in a substantially horizontal generating line. A feed or discharge conveyor, which is displaceable with respect to the helical conveyor, joins the upper run of the conveyor belt of the helical conveyor.

20 Claims, 8 Drawing Figures

HELICAL CONVEYOR

BACKGROUND OF THE INVENTION

The invention relates to a helical conveyor for the transport along a helical stretch, with a substantially vertical central axis and equipped with an endless conveyor belt, the upper run of this conveyor belt following a helical path and ending at the lower end and at the upper end in a substantially horizontal generating line.

SUMMARY OF THE INVENTION

It is an object of the present invention to provide a helical conveyor which is especially suitable for unloading or loading a ship's hold or the like, where the cargo must be supplied to or removed from the helical conveyor in many different directions and at different levels.

According to the invention a feed or discharge conveyor, which is displaceable with respect to the helical conveyor, joins the upper run of the conveyor belt of the helical conveyor.

The displaceable feed or discharge conveyor allows the goods to be supplied to or removed from the helical conveyor in numerous different directions and at different levels.

If the junction of the feed or discharge conveyor to the upper run of the conveyor belt of the helical conveyor is located above the lower end thereof, the displaceable feed or discharge conveyor may join the upper run of the conveyor belt of the helical conveyor through a further belt conveyor for the transport through a circular bend, said further belt conveyor being connected to said feed or discharge conveyor, the direction of motion of said further belt conveyor and that of the helical conveyor substantially coinciding at their junction.

If the feed or discharge conveyor has to join the lower end of the upper run of the conveyor belt of the helical conveyor according to the invention, a first solution of the invention consists in that one end of an intermediate conveyor, which follows a path in a substantially horizontal plane, adjoins the lower end of the upper run of the conveyor belt of the helical conveyor, the other end of said intermediate conveyor being removed farther than its aforementioned end from the vertical central axis of the helical conveyor, so that other end of the intermediate conveyor lies outside the vertical projection of the helical path of the conveyor belt of the helical conveyor on the aforementioned horizontal plane, while the feed or discharge conveyor is displaceable with respect to said intermediate conveyor and joins this intermediate conveyor.

According to this arrangement, the intermediate conveyor may travel through a path of at least 360 degrees, composed of a plurality of circular bends.

An alternative embodiment of the helical conveyor according to the invention is characterized in that a first belt conveyor adapted for the transport through a circular bend is positioned below the helical conveyor, while an auxiliary helical conveyor is mounted below said first belt conveyor, a lower belt conveyor adapted for the transport through a circular bend being positioned underneath said auxiliary helical conveyor, the central axes of the helical conveyor and of the auxiliary helical conveyor being aligned with each other, while the centers of the two belt conveyors lie on a line coinciding with these center lines, the first belt conveyor being connected to the auxiliary helical conveyor and being rotatable together with said auxiliary helical conveyor about the central axis of this auxiliary helical conveyor, the lower belt conveyor joining the feed or discharge conveyor.

The lower belt conveyor may also be rotatable about said central axis and may be fixedly connected to the feed or discharge conveyor.

The lower belt conveyor may be rotatable through a path of at least 360° and may be coupled over a part of this path with the auxiliary helical conveyor, so that this auxiliary helical conveyor and said first belt conveyor follow the rotational movement of the lower belt conveyor within said part of the path.

BRIEF DESCRIPTION OF THE DRAWING

The invention will be explained hereinafter with reference to the drawing, which illustrates several embodiments of a helical conveyor according to the invention by way of example.

DESCRIPTION OF SEVERAL PREFERRED EMBODIMENTS

Figure 1:
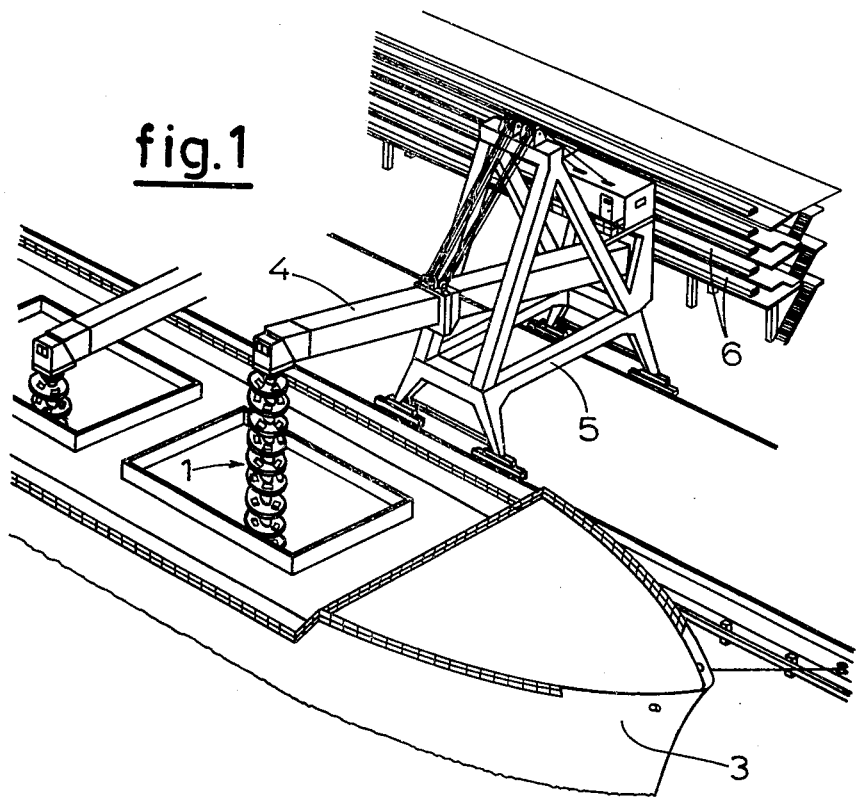
FIG. 1 is a diagrammatic perspective view of a helical conveyor according to the invention.

FIG. 1 is a diagrammatic view of a helical conveyor 1 for the transport along a helical stretch, with a vertical central axis 2. This helical conveyor 1 has been lowered into the hold of a ship 3 and serves, in the embodiment shown in FIG. 1, for removing goods upwardly from this hold. The upper end of the helical conveyor 1 joins a discharge conveyor belt (not shown), which passes through a duct 4 which supports the helical conveyor 1.

This discharge duct 4 is carried on a mobile carrier frame 5. The course of the discharge duct 4 may be modified by means of cables in such a manner that the height of its two ends can be independently adjusted. The discharge end of the discharge conveyor belt can transfer the goods carried thereon to one of a plurality of superimposed conveyor belts 6.

The helical conveyor 1 is equipped with an endless conveyor belt 7, the upper run 7' of which follows a helical path and ends at the lower end 8 in a substantially horizontal generating line.

The upper end of the upper run 7' of the conveyor belt 7 likewise ends in a substantially horizontal generating line, which joins the discharge conveyor belt in the duct 4.

Figure 2:
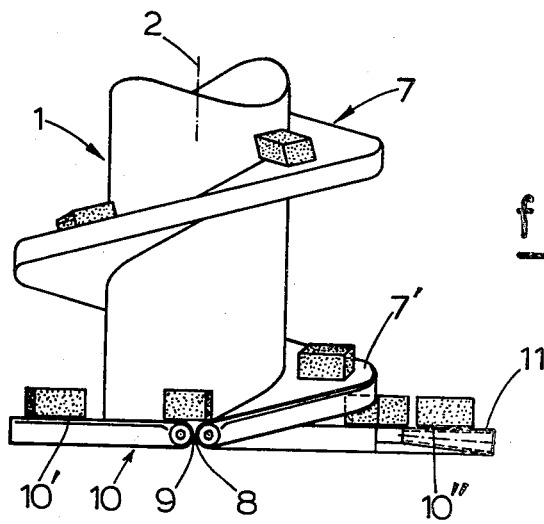
FIG. 2 is a diagrammatic lateral view of the lower part of the helical conveyor according to FIG. 1, which joins an intermediate conveyor.
Figure 3:
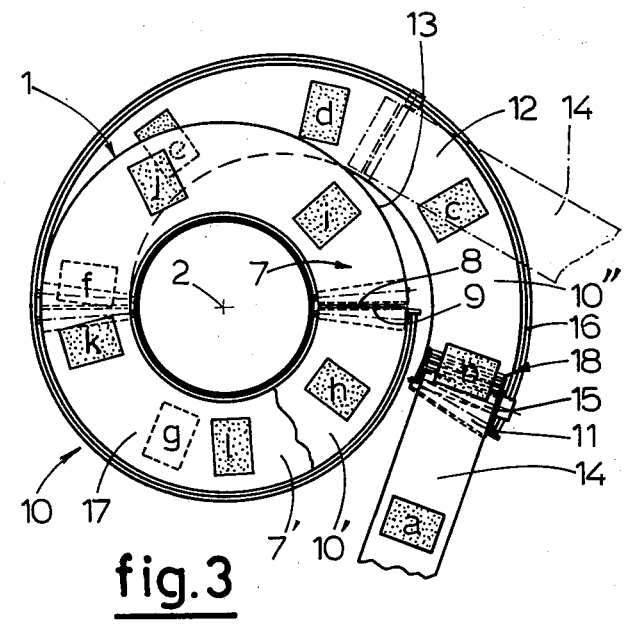
FIG. 3 is a diagrammatic top view of the lower part of the helical conveyor and of the intermediate conveyor according to FIG. 2.

In the embodiment according to FIGS. 2 and 3, an end 9 of an intermediate conveyor 10, which follows a path of at least 360 degrees in a horizontal plane, adjoins the lower end 8 of the upper run 7' of the conveyor belt 7 of the helical conveyor 1.

The other end 11 of this intermediate conveyor 10 is removed farther than its end 9 from the vertical central axis 2, as FIG. 3 clearly indicates. The end portion 12 of the intermediate conveyor 10 lies outside the vertical projection 13 of the helical path of the conveyor belt 7 of the helical conveyor 1 on the horizontal plane of the path of the intermediate conveyor 10.

A feed conveyor 14, which is preferably adjustable in length, is displaceable at its end 15 on a rail 16 along the intermediate conveyor 10, and is approximately tangential to this intermediate conveyor 10.

As an alternative, the feed conveyor 14 can join the intermediate conveyor 10 through a further belt conveyor (not shown) connected thereto and adapted for the transport through a circular bend, the direction of motion of this further belt conveyor and that of the intermediate conveyor 10 being at least approximately equal at their junction. In this case, an end of the further belt conveyor for the transport through a circular bend is naturally displaceable on the rail 16 along the intermediate conveyor 10.

In yet another embodiment, the feed conveyor 14 in its various positions may always be at approximately right angles to the outer periphery of the intermediate conveyor 10.

In the embodiment shown in FIGS. 2 and 3, the intermediate conveyor 10 is composed of a first belt conveyor 10' which joins the lower end 8 of the upper run 7' of the conveyor belt 7 of the helical conveyor 1, and which travels through a circular bend of 180 degrees, with a maximum radius that is approximately equal to that of the vertical projection 13 of the outer side of the helical path of the conveyor belt 7 of the helical conveyor 1 on the horizontal plane, and with its center lying on the vertical central axis 2 of the helical conveyor 1; and of a second belt conveyor 10", which adjoins the first belt conveyor 10' and which travels through a circular bend of approximately 220 degrees, with a different center and with a larger radius than that of the first belt conveyor 10'.

In FIG. 3, the feed conveyor 14, in the position shown in solid lines, approximately adjoins the free outer end 11 of the belt conveyor 10". The goods delivered by the feed conveyor 14 travel along the two belt conveyors 10" and 10' before reaching the lower end 8 of the upper run 7' of the conveyor belt 7 of the helical conveyor 1. Another position of the feed conveyor 14 is shown in FIG. 3 in dash-and-dot-lines.

FIG. 3 shows in part the lower turn 17 of the helical path of the upper run 7' of the conveyor belt 7 of the helical conveyor 1. The goods delivered by the feed conveyor 14 are marked (a), (b), (c) . . . in FIG. 3, the goods (e), (f), (g), located below the illustrated part of the lower turn 17, being indicated in dash-and-dot-lines.

Figure 6:
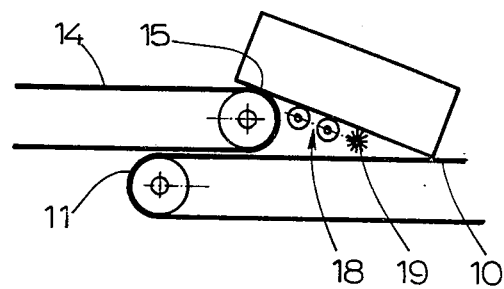
FIG. 6 is a diagrammatic view of a junction for the feed or discharge conveyor.

FIG. 6 shows that the end 15 of the feed conveyor 14 (or the end of a belt conveyor connected thereto and adapted for the transport along a circular bend) and the intermediate conveyor 10 may join through a driven roller conveyor 18 which comprises a transfer roller 19 and which gradually bridges the difference in level.

Although in the embodiment shown in FIGS. 2 and 3 the helical conveyor 1 is used for unloading the hold of a ship 3, it may also be applied for loading purposes. The goods are then transported from a conveyor belt 6 via the duct 4 to the helical conveyor 1, whereupon they are lowered along this helical conveyor 1 to the intermediate conveyor 10, from where the goods may be discharged in any desired direction by means of the conveyor 14, which in this case operates as a discharge conveyor. The roller conveyor 18, equipped with the transfer roller 19, here serves again for bridging the difference in level.

Figure 4:
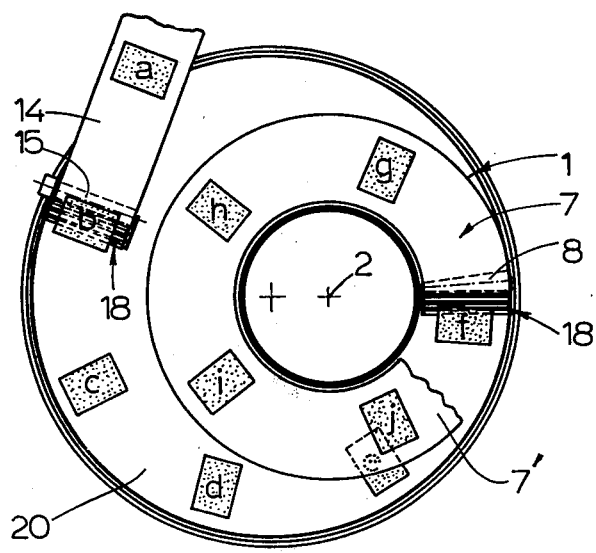
FIG. 4 is a diagrammatic top view of the lower part of the helical conveyor and of a co-operating disk.

FIG. 4 shows an embodiment of the helical conveyor 1 according to the invention, in which a rotatably supported disk 20, which is connected to a drive means (not shown), joins the lower end 8 of the upper run 7' of the conveyor belt 7. This disk 20 extends in a horizontal plane. The radius of the disk 20 is larger than that of the vertical projection of the outer side of the helical path of the conveyor belt 7 of the helical conveyor 1 on the plane of the disk 20. This vertical projection 13 is tangential to the outer periphery of the disk 20 in the embodiment shown.

The direction of motion of the disk 20 at the junction is substantially equal to that of the helical conveyor 1. The lower end of the helical conveyor 1, which joins the disk 20, may be equipped with a roller conveyor 18 which comprises a transfer roller and which bridges the difference in level.

The end 15 of the feed or discharge conveyor 14 is displaceable on a rail along the outer side of the disk 20. The conveyor 14 is approximately tangential to the disk 20 over at least part of its length. In order to bridge the difference in level, the end 15 of the feed or discharge conveyor 14 is again equipped with a roller conveyor 18 which comprises a transfer roller. The feed or discharge conveyor 14 may be adjustable in length.

As an alternative for the embodiment shown, the feed or discharge conveyor 14 may also join the disk 20 through a further belt conveyor (not shown) connected thereto and adapted for the transport through a circular bend, the direction of motion of this further belt conveyor and that of the disk 20 being approximately equal to their junction. The further belt conveyor may be equipped with a roller conveyor which comprises a transfer roller.

Furthermore, in yet another embodiment, the feed or discharge conveyor 14 may be approximately radial with respect to the disk 20 in its various positions.

Figure 5:
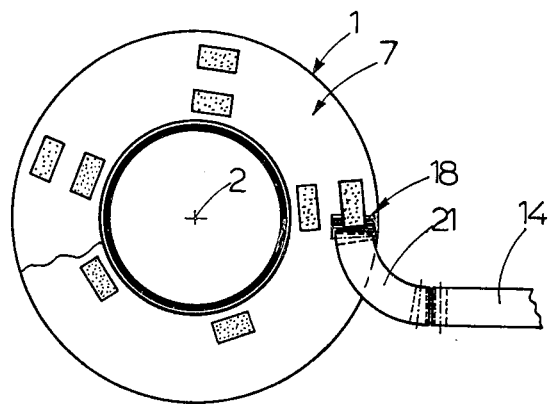
FIG. 5 is a diagrammatic top view of a helical conveyor according to the invention, wherein the feed or discharge conveyor joins this helical conveyor through a belt conveyor for the transport along a circular bend, the junction being located above the lower end of the helical conveyor.

FIG. 5 shows an embodiment of the helical conveyor 1 according to the invention, in which the displaceable feed or dischage conveyor 14 joins the upper run 7' of the conveyor belt 7 above the lower end 8 thereof, through a further belt conveyor 21 connected to the conveyor 14 and adapted for the transport through a circular bend. The end of the belt conveyor 21 is again equipped with a roller conveyor 18 which comprises a transfer roller.

In the embodiment according to FIG. 5, the end of the belt conveyor 21 adapted for the transport through a circular bend has a width that is smaller than the width of the upper part 7' of the conveyor belt 7 of the helical conveyor 1, so that, when the conveyor 14 is used as a discharge conveyor, only part of the goods are discharged by means of this discharge conveyor 14, while the remaining goods continue to follow the helical path of the helical conveyor 1, from which they are withdrawn at a different level.

Alternatively, the feed or discharge conveyor 14 and the belt conveyor 21 may have such a width that they can accommodate the complete flow of goods supplied to or discharged from the helical conveyor 1.

Figure 7:
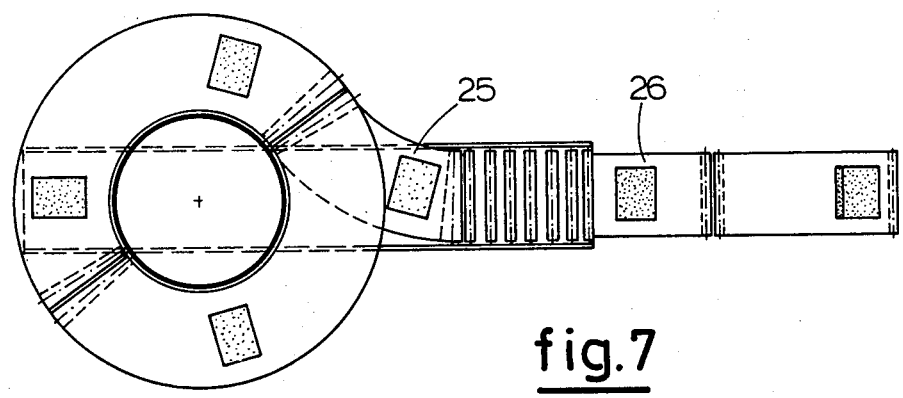
FIG. 7 is a diagrammatic top view of an embodiment of an intermediate conveyor construction below the helical conveyor.
Figure 8:
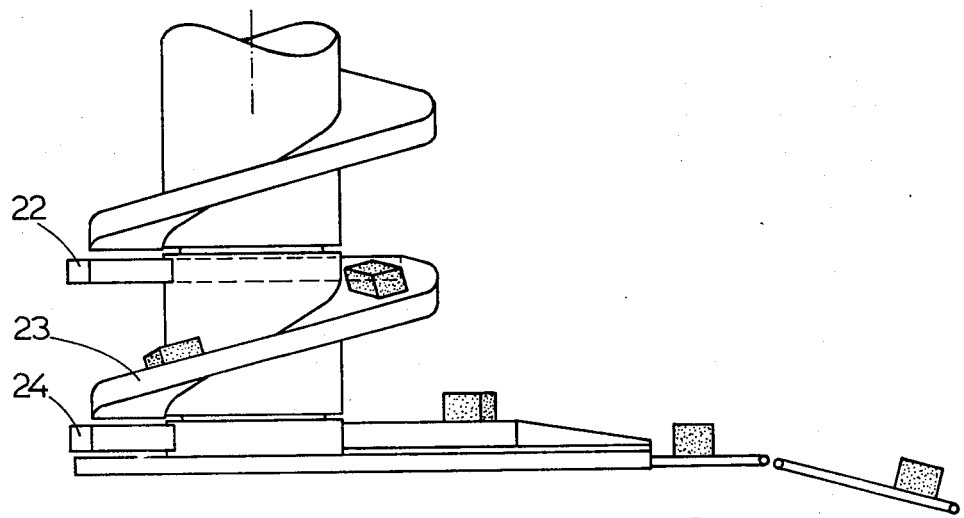
FIG. 8 is a diagrammatic lateral view of the intermediate conveyor construction according to FIG. 7.

FIG. 7 and 8 show another embodiment of the helical conveyor 1 according to the invention which is provided with an intermediate conveyor construction between this helical conveyor 1 and the feed or discharge conveyor, which intermediate construction has a contour which is not exceeding the contour of the helical conveyor 1. In this embodiment a first belt conveyor 22 adapted for the transport through a circular bend is positioned below the helical conveyor 1. An auxiliary helical conveyor 23 is mounted below this first belt conveyor 22 while a lower belt conveyor 24 adapted for the transport through a circular bend is positioned underneath this auxiliary helical conveyor 23.

The central axes of the helical conveyor 1 and of the auxiliary helical conveyor 23 are aligned with each other, while the centers of the belt conveyors 22 and 24 lie on a line coinciding with these center lines.

Further the upper runs of the endless conveyor belts of both belt conveyors 22, 24 lie in approximately horizontal planes, while the cylindrical envelope of the helical conveyor 1 touches both belt conveyors 22, 24 as well as the auxiliary helical conveyor 23.

The upper belt conveyor 22 is connected to the auxiliary helical conveyor 23. The upper belt conveyor 22 and the auxiliary helical conveyor 23 may be rotated together about the central axis of the auxiliary helical conveyor 23.

In the embodiment shown in FIGS. 7 and 8 the lower belt conveyor 24 is also rotatable about this central axis and is fixedly connected to the feed or discharge conveyor. Both belt conveyors 22, 24 are adapted for the transport through a circular bend of 180° but larger belt conveyors may be applied.

The lower belt conveyor 24 may be rotated through a path of at least 360° and is coupled over a part of this path—in the embodiment shown over a part of 180°—with the auxiliary helical conveyor 23, so that this auxiliary helical conveyor 23 and the upper belt conveyor 22 follow the rotational movement of the lower belt conveyor 24 over this part of the path.

In the embodiment shown in FIGS. 7 and 8 the feed or discharge conveyor comprises a further belt conveyor 25 for the transport through a circular bend. This further belt conveyor 25 is connected to the lower belt conveyor 24 in such manner that the direction of motion of said further belt conveyor 25 and that of the lower belt conveyor 24 substantially coincide at their junction.

This belt conveyor 25 is connected to a plurality of straight belt conveyors 26 through a roller conveyor, which may comprise a transfer roller.

Further, the lower end of the helical conveyor 1 and/or the lower end of the auxiliary helical conveyor 23 may be equipped with a roller conveyor, which may comprise a transfer roller.

Of course, the feed or discharge conveyor may be constructed in different manners and may be displaceable with respect to the lower belt conveyor 24, or may be directed radially Further, the length of the feed or discharge conveyor may be adjustable.

According to the invention, a helical conveyor 1 is provided, which allows the material to be supplied to or to be discharged from the helical conveyor 1 in many different directions and at different levels, use being made of the feed or discharge conveyor, which is displaceable with respect to the helical conveyor 1 and which may be equipped with a further belt conveyor adapted for the transport along a circular bend. As a result thereof the range of possible applications of the helical conveyor 1 is very substantially extended.

The invention is not restricted to the embodiments shown in the drawing by way of example, which may be varied in various manners within the scope of the appended claims.

I claim:

1. A helical conveyor for transporting along a helical stretch, having a substantially vertical central axis and equipped with an endless conveyor belt; an upper run of said conveyor belt following a helical path and ending at a lower end and at an upper end in a substantially horizontal generating line; one end of an intermediate conveyor, which follows a path in a substantially horizontal plane, adjoining the lower end of the upper run of the conveyor belt of the helical conveyor; the other end of said intermediate conveyor being removed farther than its aforementioned end from the vertical central axis of said helical conveyor so that said other end of said intermediate conveyor lies outside the vertical projection of the helical path of said conveyor belt of said helical conveyor on the aforementioned horizontal plane; and a feed or discharge conveyor, displaceable with respect to said intermediate conveyor, joining said intermediate conveyor.

2. A helical conveyor as claimed in claim 1, wherein the intermediate conveyor travels through a path of at least 360 degrees, which is composed of a plurality of circular bends.

3. A helical conveyor as claimed in claim 2, wherein the intermediate conveyor is composed of two adjoining belt conveyors each adapted for the transport through a circular bend, wherein the first one of said two belt conveyors joins the lower end of the upper run of the conveyor belt of the helical conveyor and travels through a bend of approximately 180 degrees, with its center located on the vertical central axis of the helical conveyor, while the second one of said two belt conveyors travels through a circular bend of approximately 220 degrees with a different center and with a larger radius than that of the first one of said two belt conveyors.

4. A helical conveyor as claimed in claim 3, wherein an end of the feed or discharge conveyor is displaceable along the intermediate conveyor, said feed or discharge conveyor being approximately tangential to said intermediate conveyor over at least part of its length.

5. A helical conveyor as claimed in claim 3, wherein the feed or discharge conveyor joins the intermediate conveyor through a further belt conveyor for the transport through a circular bend, said further belt conveyor being connected to the feed or discharge conveyor, the direction of motion of said further belt conveyor and that of the intermediate conveyor being substantially equal at their junction.

6. A helical conveyor as claimed in claim 3, wherein the feed or discharge conveyor is approximately at right angles to the outer periphery of the intermediate conveyor.

7. A helical conveyor for transporting along a helical stretch, having a substantially vertical axis and equipped with an endless conveyor belt; an upper run of said conveyor belt following a helical path and ending at a lower end and at an upper end in a substantially horizontal generating line; the lower end of the upper run of the conveyor belt of the helical conveyor joining a rotatably supported disk which is connected to a drive means and which extends in a substantially horizontal plane, said disk having a radius which is larger than that of the vertical projection of the helical path of the conveyor belt of the helical conveyor on said substantially horizontal plane, the direction of motion of the disk at the junction being substantially equal to that of the conveyor belt of the helical conveyor; and a feed or discharge conveyor, displaceable with respect to said disk, joining said disk.

8. A helical conveyor as claimed in claim 7, wherein the vertical projection of the helical path of the conveyor belt of the helical conveyor on the disk is at least approximately tangential to the outer periphery of the disk.

9. A helical conveyor as claimed in claim 8, wherein an end of the feed or discharge conveyor may be displaced over the disk, said feed or discharge conveyor being approximately tangential to the disk over at least part of its length.

10. A helical conveyor as claimed in claim 8, wherein the feed or discharge conveyor joins the disk through a further belt conveyor for the transport through a circular bend, the direction of motion of said further belt conveyor and that of the disk being approximately equal at their junction.

11. A helical conveyor as claimed in claim 8, wherein the feed or discharge conveyor extends approximately radial with respect to the disk.

12. A helical conveyor as claimed in claim 11, wherein the lower end of the helical conveyor, which joins the disk, is equipped with a roller conveyor which comprises a transfer roller.

13. A helical conveyor for transporting along a helical stretch, having a substantially vertical central axis and equipped with an endless conveyor belt; an upper run of said conveyor belt following a helical path and ending at a lower end and an upper end in a substantially horizontal generating line; wherein a first belt conveyor adapted for transporting through a circular bend is positioned below the helical conveyor; an auxiliary helical conveyor is mounted below said first belt conveyor; a lower belt conveyor, adapted for transporting through a circular bend being positioned beneath said auxiliary helical conveyor, the central axes of the helical conveyor and of the auxiliary helical conveyor being aligned with each other, the centers of the two belt conveyors lying on a line coinciding with said central axes, the first belt conveyor being connected to the auxiliary helical conveyor and being rotatable together with said auxiliary helical conveyor about the central axis of the auxiliary helical conveyor, the lower belt conveyor joining a feed or discharge conveyor.

14. A helical conveyor as claimed in claim 13, wherein the lower belt conveyor is also rotatable about said central axis and is fixedly connected to the feed or discharge conveyor.

15. A helical conveyor as claimed in claim 14, wherein the lower belt conveyor is rotatable through a path of at least 360° and is coupled over a part of this path with the auxiliary helical conveyor, so that this auxiliary helical conveyor and said first belt conveyor follow the rotational movement of the lower belt conveyor within said part of the path.

16. A helical conveyor as claimed in claim 15, wherein both belt conveyors are each adapted for the transport through a circular bend of at least 180°.

17. A helical conveyor as claimed in claim 16, wherein the upper runs of the endless conveyor belts of both belt conveyors lie in approximately horizontal planes.

18. A helical conveyor as claimed in claim 17, wherein the cylindrical envelope of the helical conveyor touches both belt conveyors as well as the auxiliary helical conveyor.

19. A helical conveyor as claimed in claim 18, wherein the feed or discharge conveyor comprises a further belt conveyor adapted for the transport through a circular bend, said further belt conveyor being connected to the lower belt conveyor in such manner that the direction of motion of said further belt conveyor and that of the lower belt conveyor substantially coincide at their junction.

20. A helical conveyor as claimed in claim 19, wherein a further belt conveyor is connected to a straight belt conveyor through a roller conveyor, which comprises a transfer roller.

* * * * *